(12) United States Patent
Mitchell (10) Patent No.: US 11,717,867 B2
(45) Date of Patent: Aug. 8, 2023

(54) SHOT SEPARATION AND RECOVERY DEVICE

(71) Applicant: 57 Trading Pty Ltd, Carrara (AU)

(72) Inventor: Craig Mitchell, Gold Coast (AU)

(73) Assignee: 57 Trading Pty Ltd, Carrara (AU)

( * ) Notice: Subject to any disclaimer, the term of this patent is extended or adjusted under 35 U.S.C. 154(b) by 170 days.

(21) Appl. No.: 17/130,311

(22) Filed: Dec. 22, 2020

(65) Prior Publication Data

US 2021/0170458 A1   Jun. 10, 2021

(30) Foreign Application Priority Data

Feb. 22, 2019 (AU) ................................ 2020900511

(51) Int. Cl.
*B09C 1/00* (2006.01)
*B07B 1/00* (2006.01)
*F42B 99/00* (2006.01)

(52) U.S. Cl.
CPC ................ *B09C 1/00* (2013.01); *B07B 1/005* (2013.01); *F42B 99/00* (2013.01)

(58) Field of Classification Search
CPC ............ B09C 1/00; B07B 1/005; F42B 99/00
USPC ...................................................... 405/128.1
See application file for complete search history.

(56) References Cited

U.S. PATENT DOCUMENTS

| 5,732,829 A | * | 3/1998 | Smith | ....................... B07B 9/00 |
| | | | | 209/639 |
| 2006/0140725 A1 | * | 6/2006 | Benjamin et al. | ........ B03B 9/02 |
| | | | | 405/128.7 |
| 2008/0314802 A1 | * | 12/2008 | Tuite | ........................ B03C 1/16 |
| | | | | 209/241 |

FOREIGN PATENT DOCUMENTS

| DE | 19546829 A1 | * | 6/1997 | ............ B03C 1/005 |
| EP | 0461893 A2 | * | 6/1991 | |
| EP | 0461893 A2 | * | 12/1991 | |
| JP | H08206537 A | * | 1/1995 | |
| WO | WO-9316330 A1 | * | 8/1993 | ............... B09C 1/00 |

* cited by examiner

*Primary Examiner* — Terrell H Matthews
(74) *Attorney, Agent, or Firm* — Renner, Otto, Boisselle & Sklar, LLP (57) ABSTRACT

A mobile machine for separation and recovery of spent shot, the machine including a drive unit to provide self-propelled mobility to the machine, a charged soil collection assembly mounted relative to the drive unit to collect soil charged with spent shot, and at least one separation assembly to separate spent shot from other collected material, the spent shot conveyed to a collection vessel for disposal.

24 Claims, 8 Drawing Sheets

SHOT SEPARATION AND RECOVERY DEVICE

TECHNICAL FIELD

The present invention relates generally to mobile machinery enabling separation of solid materials and particularly to a mobile machine for separation and recovery of spent shot.

BACKGROUND ART

Bullets are mostly made of materials harmful to the environment and living organisms, such as lead, antimony and arsenic. Many shooting ranges have a soil backstop, and the bullets remaining in the soil pose a risk of polluting the soil, surface waters and ground waters.

The jacket, which refers to a coating on the bullet, partly protects the lead from coming into contact with the surrounding soil. Currently, the jacket is made of a mixture of copper (90-95%) and zinc (5-10%). The core of the bullet is composed mainly of lead (97-99%) and small amounts of antimony (1-3%). Of the total mass, a bullet is about 89% lead and 9% of copper. Antimony and zinc take approximately 1% of the total mass. Even after the wars, bullets with a nickel jacket were used. The use of these ended in the 1950s. Thus, old shooting ranges may have nickel contaminants from bullets.

Further, the lead used in bullets and shot pellets is not pure, but largely comes from melted lead batteries containing many impurities. Pure lead corrodes very slowly.

There is therefore a problem that exists in leaving spent shot in locations that contributes to polluting the soil, surface waters and ground waters.

It will be clearly understood that, if a prior art publication is referred to herein, this reference does not constitute an admission that the publication forms part of the common general knowledge in the art in Australia or in any other country.

SUMMARY OF INVENTION

The present invention is directed to mobile machine for separation and recovery of spent shot, which may at least partially overcome at least one of the abovementioned disadvantages or provide the consumer with a useful or commercial choice.

With the foregoing in view, the present invention in one form, resides broadly in a mobile machine for separation and recovery of spent shot, the machine including a drive unit to provide self-propelled mobility to the machine, a charged soil collection assembly mounted relative to the drive unit to collect soil charged with spent shot, and at least one separation assembly to separate spent shot from other collected material, the spent shot conveyed to a collection vessel for disposal.

The machine of the present invention will preferably be self powered and self-propelled. The machine will typically be driven, via the drive unit, by an operator, typically a human operator, but the machine could be autonomous and controlled using GPS coordinates or similar systems.

The machine of the present invention will typically provide a single pass collection, separation and recovery of spent shot. The machine will typically remove a layer of soil which is charged with spent shot, separate the spent shot from the collected material, returning the other material to the ground whilst retaining the separated spent shot for later disposal.

The machine of the present invention may further include an assembly to provide soil additives such as nutrients or other therapeutic material to assist with remediation of the soil following the removal of the spent shot given that the spent shot will typically have adverse affected the soil. Where provided, the assembly will typically be provided in a forward part of the integrated unit (discussed further below), ahead of the soil collection assembly. In this configuration, this will allow the nutrient or material to be mixed with the soil before collection allowing the material to be mixed thoroughly with the soil, before the separated soil is returned to the ground. Alternatively the material may be applied once the separated soil is returned to the ground.

In use, the machine will typically be driven over a portion of ground, typically in the area where there is a lot of spent shot, such as a rifle or shooting range for example, in order to collect the charged soil from that area and separate the soil from the spent shot.

The mobile machine includes a drive unit to provide self-propelled mobility to the machine. The drive unit may have any form. For example, the drive unit may be integrated into the machine by an original equipment manufacturer or a standalone drive unit which is attached to the integrated unit (discussed further below) can be used. One preferred embodiment uses a conventional bulldozer type drive unit or another piece of heavy equipment such as a front end loader for example, as the drive unit and the soil collection assembly and the separation assembly is typically provided as a single, integrated unit mounted relative to a frame which is preferably positioned forwardly, ahead of the drive unit.

The drive unit will generally require significant traction and for that reason, it is preferred that the drive unit be provided with tracks rather than wheels.

It is preferred that the drive unit is operated by an operator and a control cabin is typically provided on or relative to the drive unit for the operator. The cabin will typically be sealed as well as possible as the operation of the machine will typically disturb quite an amount of dust which may form a hazard for the operator. It is preferred that the cabin be provided with an air pump associated with filtration in order to provide air to the cabin. The cabin may be provided with positive pressure in order to actively limit the ingress of dust into the cabin. The driver may be required to wear a personal protection suit, typically provided with breathing apparatus to minimise the chance that the driver will ingest or inhale dust formed through use of the machine.

Other elements or components of the machine related to the separation assembly or the collection vessel for example may be mounted to or relative to the drive unit in order to form a self contained machine for the separation and recovery of spent shot. For example, the spent shot collection vessel may be provided, typically towards the rear of the drive unit. Liquid storage such as water for example may also be provided relative to the drive unit, again, typically towards the rear of the drive unit.

The machine of the present invention may include a dust suppression system including one or more water spray assemblies. If provided with a dust suppression system of this type, it is preferred that the dust suppression system be provided peripherally of the machine, typically with one or more fluid lines associated with one or more spray nozzles.

In a preferred embodiment, the machine may be provided with one or more dust shields or shrouds. One or more dust shields or shrouds may be applied to the tracks or other portions of the drive unit, to contain as much dust as possible, whilst of course, not limiting visibility of the operator from the cabin of the drive unit. Where provided, it is preferred that the dust shields or shrouds are flexible. Typically, the dust shields or shrouds will extend to approximately the ground surface in order to retain the dust inside the dust shields or shrouds as much as possible.

As mentioned above, it is preferred that the soil collection assembly and at least one separation assembly is provided as an integrated unit mounted to or relative to a forward side of the drive unit. In this way, the operator can observe the operation of the integrated unit as well as being positioned to properly drive and steer the machine as required.

In one preferred embodiment, the drive unit will typically be fitted with one or more forward lifting assemblies configured to lift a rear portion or end of the integrated unit. The forward lifting assemblies may comprise one or more lifting members (such as, but not limited to, arms). The forward end of the integrated unit will typically be provided with one or more support assemblies, typically wheels or the like. The wheels may be of any type but in a preferred embodiment, generally wheels with pneumatic tires. The support assemblies are typically adjustable up-and-down to change the height of the integrated unit and/or the separation of the integrated unit relative to the ground surface. The support assemblies will typically be multidirectional with the integrated unit and the machine in general steered from the rear by the drive unit.

Together, the drive unit and the forward support assemblies will typically act to hold the integrated unit substantially parallel to the ground surface and allow movement of the integrated unit over the ground surface allowing collection of soil charged with spent shot by the collection assembly.

The machine of the present invention includes a charged soil collection assembly mounted relative to the drive unit to collect soil charged with spent shot. The collection assembly typically includes a number of subassemblies, including a cutter subassembly to disturb the soil before collection, a scoop assembly or similar to collect the soil and spent shot and a conveyor assembly to convey the soil and spent shot collected to the separation assembly. In a preferred embodiment, the cutter assembly is provided ahead of the scoop assembly with the scoop assembly provided ahead of the conveyor assembly in the direction of travel.

The cutter assembly typically includes one or more disks or similar in order to open or dislodge or break up the soil prior to collection. The one or more disks can be rotating disks or fixed disks. If provided as rotating disks, the disks can be powered through rotation or not. Preferably, the cutter assembly is provided extending across the width of the machine. The cutter assembly will typically be height/depth adjustable such that the depth to which the soil is disrupted or dislodged can be changed. In a preferred embodiment, the working depth of the cutter assembly may be up to 300 mm with an average working depth of approximately 250 mm.

The scoop assembly will also typically extend substantially across the width of the machine, located preferably behind the cutter assembly. The scoop will typically be or include a simple angled forward edge which extends downwardly to a working depth, similar to that of the cutter assembly in order to scoop soil into the collection assembly via the forward movement of the machine. The scoop will typically have a hard forward edge in order to maximise the working life of the scoop.

In some embodiments of the invention, the soil collection assembly may further comprise a suction assembly. The suction assembly may be of any suitable form, although it is envisaged that the suction assembly may be configured to exert a suction force on the soil to collect soil therein. In particular, the suction assembly may be configured to exert a suction force so that loose material on the ground surface and/or the cutter assembly and/or the scoop assembly may be sucked into the soil collection assembly.

Material collected using the suction assembly may then be transferred to a separation assembly (such as one or more screens, as discussed in more detail later). The material may be transferred using any suitable technique, such as under gravity, via a conveying assembly or the like. In a preferred embodiment of the invention, however, the suction assembly may be associated with a blower assembly. In this embodiment of the invention, the blower assembly may be configured to blow material collected by the suction assembly towards, onto and/or into the separation assembly.

The suction assembly and/or the blower assembly may be powered using any suitable power source. For instance, the suction assembly and/or the blower assembly may be powered using the same battery, motor or the like that provides power to the machine. Alternatively, the suction assembly and/or the blower assembly may be powered using a hydraulic or pneumatic system associated with the machine. In other embodiments, the suction assembly and/or the blower assembly may be provided with its own power source, such as one or more batteries, motors or the like. The power source may be electrically associated with one or more pumps configured to generate the suction force of the suction assembly and/or the blowing force of the blower assembly.

Preferably the suction assembly may include one or more suction heads. In a preferred embodiment, the one or more suction heads may extend at least partially across the width of the machine. More preferably, the one or more suction heads may extend across substantially the entire width of the machine.

In some embodiments of the invention, the suction head may be configured for movement relative to the ground surface. Specifically, the suction head may be configured to be raised and lowered relative to the ground surface. It is envisaged that the suction head may be moved relative to the ground surface to adjust the amount of material collected by the suction assembly. The suction head may be raised and lowered using any suitable device. However, in a preferred embodiment of the invention one or more hydraulic and/or pneumatic cylinders may be used to raise and lower the suction head relative to the ground surface.

In a preferred embodiment of the invention, the suction assembly may be located in a forward region of the machine. In another embodiment of the invention, at least the suction head may be located in a forward region of the machine. The suction head may be associated with a frame member of the machine and may depend therefrom.

In some embodiments of the invention, the suction assembly may be retrofitted to existing machines that are not provided with a suction assembly. In this embodiment of the invention, the suction assembly, or at least the suction head, may be associated with a frame section that may be retrofitted to the existing frame of a machine. Thus, the suction assembly, or at least the suction head, may be associated with an extension frame portion.

Preferably, the one or more suction heads may be associated with one or more conduits configured to transport material collection by the suction heads to the separation assembly. The one or more conduits may be of any suitable, and may include one or more pipes, hoses or the like.

In some embodiments of the invention, material passing through the one or more conduits may be discharged directly into or onto the separation assembly. Alternatively, material exiting the one or more conduits may pass through a classification device prior to being introduced to the separation assembly. The classification device may be of any suitable type, although in a preferred embodiment of the invention the classification device may be configured to classify the material exiting the one or more conduits on the basis of one or more properties of the material. The material may be classified according to any suitable properties, although it is envisaged that the properties may include particle size, density or the like.

In a specific embodiment of the invention, the classification device may be configured to discharge heavier, larger and/or denser particles onto one portion of the separation assembly, while lighter, smaller and/or less dense particles may be discharge onto a different portion of the separation assembly. In this way, the separation of material in the separation assembly may be conducted more quickly and/or more efficiently.

In some embodiments, it is envisaged that the suction assembly may be provided with one or more additional inlets. The additional inlets may be provided at any suitable location, although in some embodiments of the invention the one or more additional inlets may be provided on the exterior of the machine. In this embodiment of the invention, the one or more additional inlets may be configured for connecting a conduit (such as a hose or the like) thereto. In this way, it is envisaged that a user may hold the hose and collect material from the ground surface adjacent to the machine. In a preferred embodiment of the invention, each of the one or more additional inlets may be provided with an actuation member (such as a valve or the like) so that the actuation member may be closed when the inlet is not in use.

The conveyor assembly may be of any type. Initial separation of the soil and other material from the spent shot may begin with the conveyor. In a preferred form, at least one conveyor belt is provided and in a particularly preferred form, the or each conveyor belt will preferably be a mesh conveyor belt with openings in the mesh allowing material to fall through if it is of a small size.

In a preferred form, a pair of opposed conveyor assemblies will be provided, an upper conveyor assembly and a lower conveyor assembly. The lower conveyor assembly will typically support material thereon as it is conveyed with the upper conveyor assembly preferably spaced apart by a predetermined distance to assist with initial break up of large clumps of collected soil and/or to hold the material on the lower conveyor.

One or more elements may be provided on the conveyor belt in order to assist with the breakup of material on the conveyor belt.

The conveyor assembly will typically be angled upwardly and rearwardly in order to raise the collected soil above the ground level to provide gravity feed into the separation assembly. Preferably, an upper end of the conveyor assembly will be provided over a forward end of the separation assembly.

The machine of the present invention includes at least one separation assembly to separate spent shot from other collected material. The separation assembly may use one or more separation processes, of the same or different type, to achieve separation of the spent shot. In a preferred form, the separation assembly will typically include at least one vibration separation process and at least one pneumatic separation process.

In particular, one or more vibration screens may be provided and typically, more than one will be provided. The vibration screens will typically be provided parallel to one another and they may be angled if necessary either toward or away from the entry end of the vibration screens as this may achieve vibratory transportation of material on the screens in a particular direction. Typically, the vibration screens will be provided substantially horizontally and spaced apart from one another. Where more than one vibration screen is provided, it is preferred that each vibration screen is provided with a different gauge with the sizing generally reducing as from upper to lower in the assembly. The gauge of the screen may vary from 10 mm openings down to one or more smaller sizes. In a preferred configuration, one screen is provided with a 3.5 mm gauge and a 2nd screen provided with a 1.5 mm gauge.

In a preferred embodiment, the vibration will be applied laterally, typically induced by the provision of an eccentric drive with each of the screens mounted relative to a vibration module and the vibration module mounted relative to the integrated unit using one or more arms to allow movement of the vibration module back and forth.

Additional diminution devices or members may be provided preferably associated with at least one, and preferably each of the vibration screens in order to assist with breakup of the material on the screens and/or to prevent clogging of the screens. In a preferred embodiment, the diminution devices or members will be or include a number of spheres provided relative to each of the screens. Preferably, the spheres will be made of a material such as rubber in order to assist with the separation using the vibration screens. The spheres will typically be freely movable relative to the screens but will typically be retained relative to a single screen, at least loosely. As mentioned above, it is preferred that each screen has a number of spheres provided relative thereto.

Preferably, the material exceeding from the last screen will exit into the pneumatic separation assembly, preferably into a primary pneumatic separation chamber. The pneumatic separation assembly is preferably provided in order to separate the stones or similar from the spent shot, typically based on density. Whilst not wishing to be limited by theory, the air will typically carry any stones or similar out of the pneumatic separation assembly but the spent shot, being denser than the stones, will typically fall and be retained and collected in the pneumatic separation assembly. Typically, the airspeed and/or pressure will be optimised to allow separation on this basis although the airspeed and/or pressure can typically be adjusted in order to achieve it. After separation, any stones or similar typically returned to the ground surface with the spent shot retained.

In a preferred embodiment, the spent shot will typically fall and be conveyed to a collection vessel. One or more screw conveyors can be used in order to convey the spent shot to the collection vessel and typically, at least one screen conveyor is associated with an elongate conduit in communication with the collection vessel, which is mentioned above, will typically be mounted relative to the drive unit, and preferably the rear of the drive unit.

The air for the pneumatic separation assembly will typically be obtained from an air cutter assembly, which in a preferred embodiment is an elongate assembly provided substantially vertically above the integrated unit with an air inlet facing forwardly in the direction of travel. The inlet is typically spaced above the integrated unit in order to provide the inlet in an area substantially clear of dust which is formed through use of the machine. The air will typically be conveyed downwardly through an elongate conduit, preferably directly to the primary pneumatic separation chamber.

A secondary pneumatic separation chamber is typically provided in association with the primary pneumatic separation chamber with the secondary pneumatic separation chamber provided with at least one, and typically a number of baffles across which the air is blown with the stones and other material conveyed across the top of the baffles but the spent shot, being denser, falling between the baffles into a lower part of the secondary pneumatic separation chamber.

As mentioned above, the air flow, speed and/or pressure are typically adjustable.

The air cutter assembly will typically be braced in the vertical orientation and may be foldable or collapsible in order for transport.

As mentioned above, both the separation assembly of the collection assembly are typically provided as an integrated unit with the integrated unit including a support frame with the forward end supported by the support assemblies and the rear end supported by the drive unit with the separation assembly and the collection assembly mounted relative to the frame.

The entire integrated unit will typically be covered with one or more dust shields or shroud is similar to that discussed above in relation to the drive unit in order to substantially contain any dust which is formed. Again, it is preferred that the dust shields or shrouds be flexible and extend substantially down to ground level as well as across the top of the integrated unit. A water-based dust suppression perimeter is typically defined as discussed above.

The machine of the present invention is therefore typically adapted to provide single pass collection and separation of spent shot from any soil collected with the soil returned to the ground surface and the spent shot collected for later disposal.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a shot separation and recovery machine 10 is provided.

The mobile machine 10 for separation and recovery of spent shot illustrated in the accompanying Figures includes a drive unit 11 to provide self-propelled mobility to the machine 10, a charged soil collection assembly 12 mounted relative to the drive unit 11 to collect soil charged with spent shot, and a separation assembly 13 to separate spent shot from other collected material, the spent shot conveyed to a collection vessel 14 for disposal.

The machine 10 illustrated is self powered and self-propelled. The machine 10 will typically be operated, via the drive unit 11, by an operator, typically a human operator, but the machine could be autonomous and controlled using GPS coordinates or similar systems.

The machine of the present invention will typically provide a single pass collection, separation and recovery of spent shot. The machine 10 will remove a layer of soil which is charged with spent shot, separate the spent shot from the collected material, returning the other material to the ground whilst retaining the separated spent shot for later disposal. In use, the machine will typically be driven over a portion of ground, typically in the area where there is a lot of spent shot such as a rifle or shooting range for example, in order to collect the soil from that area and separate the soil from the spent shot.

Although not illustrated in the Figures, the machine may further include an assembly to provide soil additives such as nutrients or other therapeutic material to assist with remediation of the soil following the removal of the spent shot given that the spent shot will typically have adverse affected the soil. Where provided, the assembly will typically be provided in a forward part of the integrated unit 15 (discussed further below) ahead of the soil collection assembly. In this configuration, this will allow the nutrient or material to be mixed with the soil before collection allowing the material to be mixed thoroughly with the soil before the separated soil is returned to the ground.

The drive unit 11 of the illustrated embodiment uses a conventional bulldozer type drive unit or another piece of heavy equipment such as a front end loader for example as the drive unit 11 and the soil collection assembly 12 and the separation assembly 13 is provided as a single, integrated unit 15 mounted relative to a frame 16 which is positioned forwardly, ahead of the drive unit 11.

The drive unit 11 will generally require significant traction and for that reason, it is preferred that the drive unit be provided with tracks 17 rather than wheels.

The drive unit is operated by an operator and a control cabin 18 is provided on or relative to the drive unit 11 for the operator. The cabin 18 is sealed as well as possible as the operation of the machine 10 will disturb quite an amount of dust which may form a hazard for the operator. The cabin 18 is provided with an air pump 19 in order to provide air to the cabin 18. The cabin 18 may be provided with positive pressure in order to actively limit the ingress of dust into the cabin 18. The driver may be required to wear a personal protection suit, typically provided with breathing apparatus to minimise the chance that the driver will ingest or inhale dust formed through use of the machine 10.

Other elements or components of the machine 10 related to the separation assembly 13 or the collection vessel 14 for example may be mounted to or relative to the drive unit 11 in order to form a self contained machine for the separation and recovery of spent shot. For example, the spent shot collection vessel 14 is provided towards the rear of the drive unit 11. A liquid storage vessel 20 for liquid such as water for example may also be provided relative to the drive unit 11, again, typically towards the rear of the drive unit 11.

The machine 10 includes a dust suppression system including one or more water spray assemblies. If provided with a dust suppression system of this type, it is preferred that the dust suppression system be provided peripherally of the machine 10, typically with one or more fluid lines associated with one or more spray nozzles.

Figure 1:
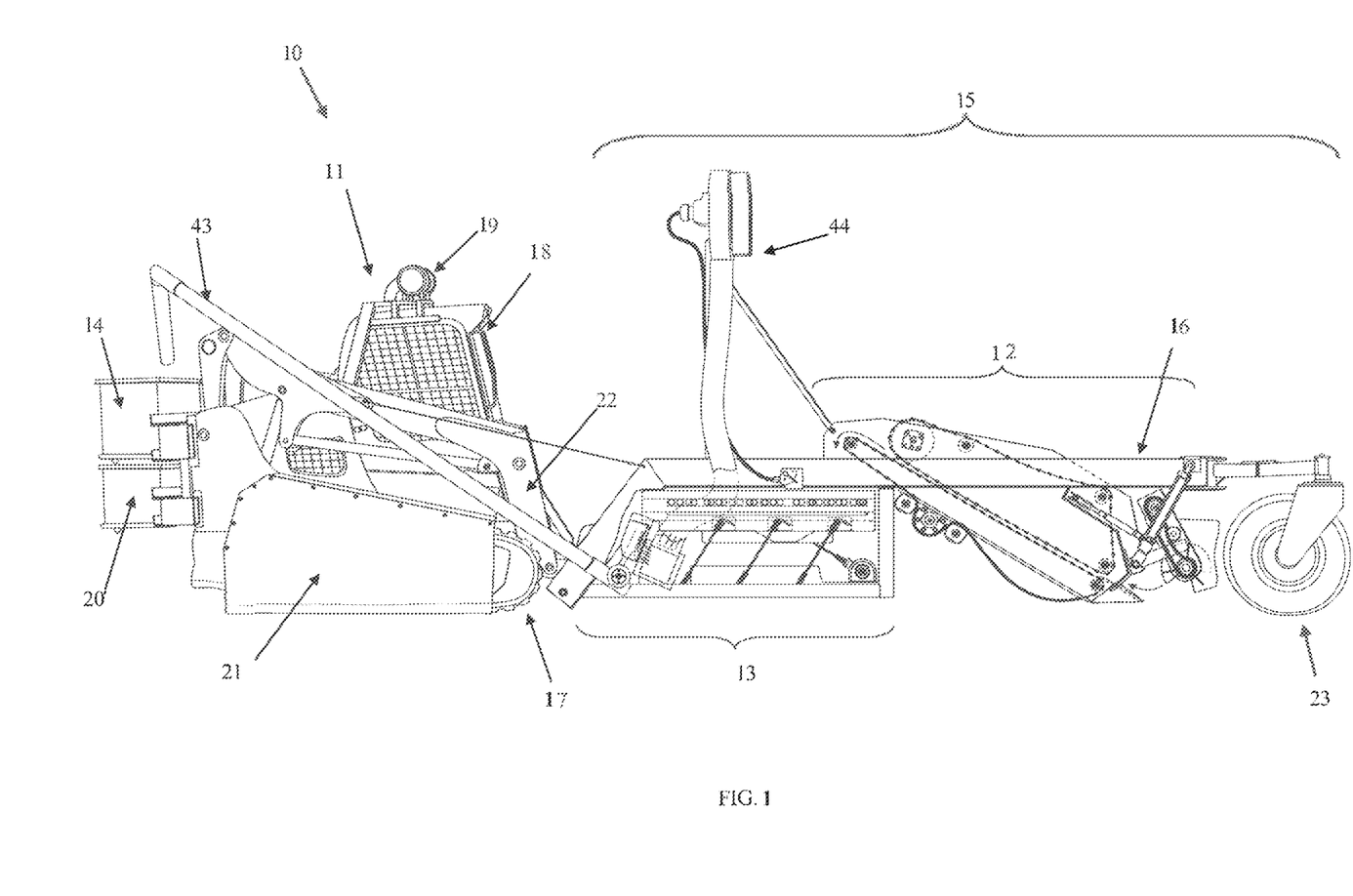
FIG. 1 is a side view of a shot separation and recovery apparatus according to a preferred embodiment of the present invention.
Figure 6:
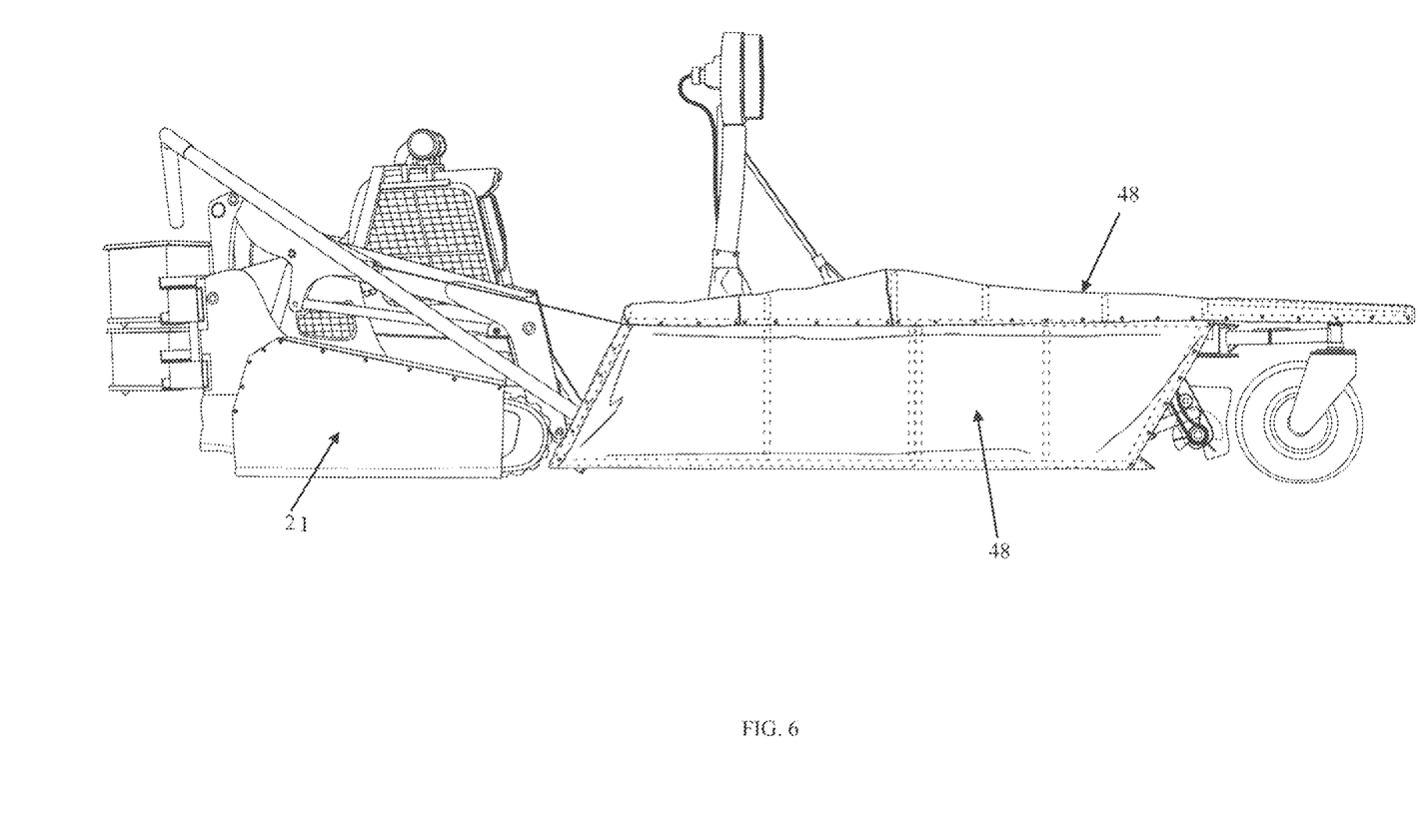
FIG. 6 is a side view of a shot separation and recovery apparatus with a cover according to a preferred embodiment.
Figure 7:
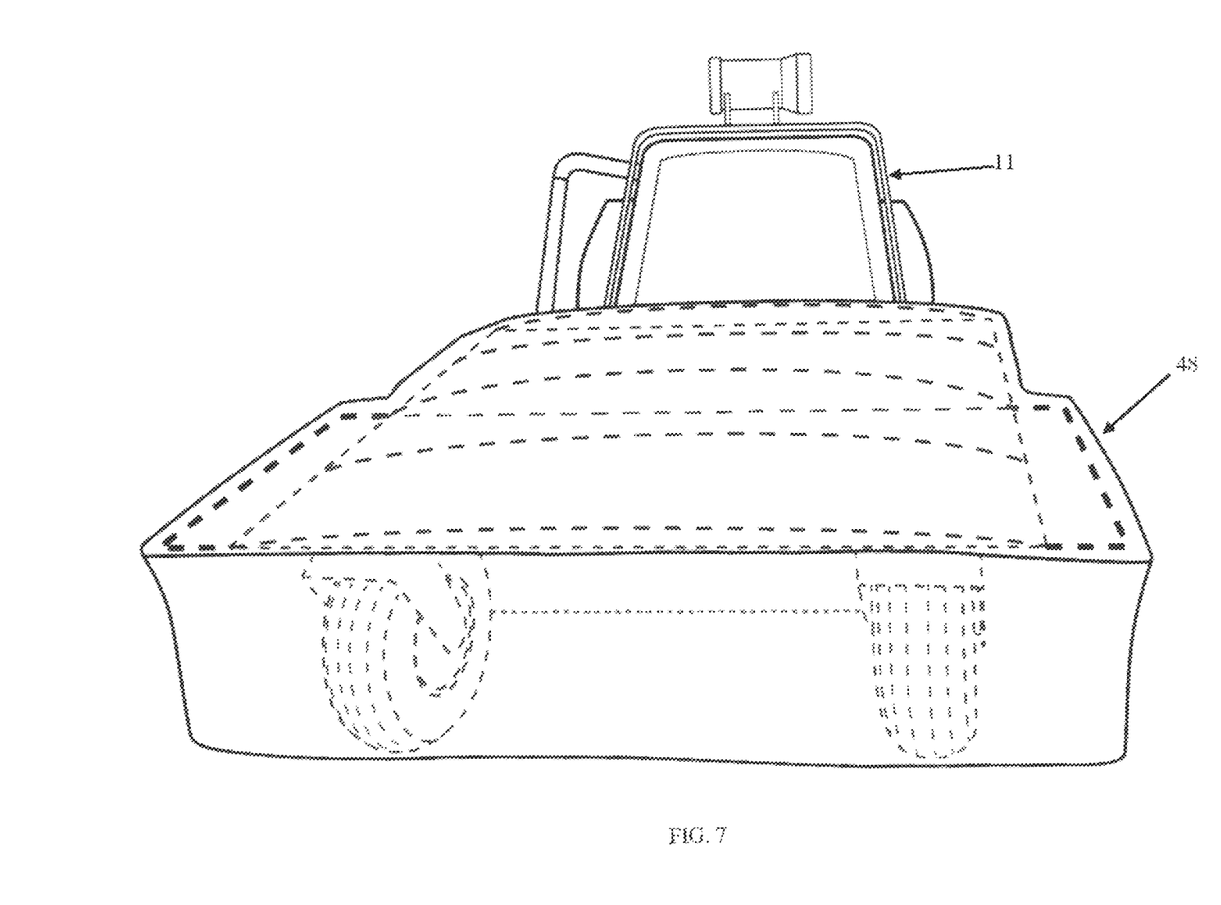
FIG. 7 is a front view of the shot separation and recovery apparatus with a cover according to a preferred embodiment.

In a preferred embodiment, the machine 10 is provided with one or more dust shields or shrouds as illustrated in FIGS. 1, 6 and 7. A dust shield or shroud 21 is applied to the tracks 17 or other portions of the drive unit 11 to contain as much dust as possible, whilst of course, not limiting visibility of the operator from the cabin 18 of the drive unit. Where provided, it is preferred that the dust shields or shrouds are flexible. Typically, the dust shields or shrouds will depend to approximately the ground surface in order to retain the dust inside the dust shields or shrouds as much is possible.

As mentioned above, it is preferred that the soil collection assembly 12 and at least one separation assembly 13 is provided as an integrated unit 15 mounted to or relative to a forward side of the drive unit 10 as shown in FIG. 1. In this way, the operator can see the operation of the integrated unit 15 as well is being positioned to properly drive and steer the machine 10 as required.

In the illustrated embodiment, the drive unit 11 is fitted with forward lifting arms 22 in order to lift a rear portion or end of the integrated unit 15. The forward end of the integrated unit 15 is provided with wheels 23, generally wheels with pneumatic tires. The forward wheels 23 are typically adjustable up-and-down to change the height of unit 15 and/or the separation of the unit 15 relative to the ground surface. The wheels are multidirectional with the integrated unit 15 and the machine 10 in general driven and steered from the rear by the drive unit 11.

Together, the drive unit 11 and the forward wheels 23 act to hold the integrated unit 15 substantially parallel to the ground surface and allow movement of the integrated unit 15 over the ground surface allowing collection of soil charged with spent shot by the collection assembly 12.

Figure 5:
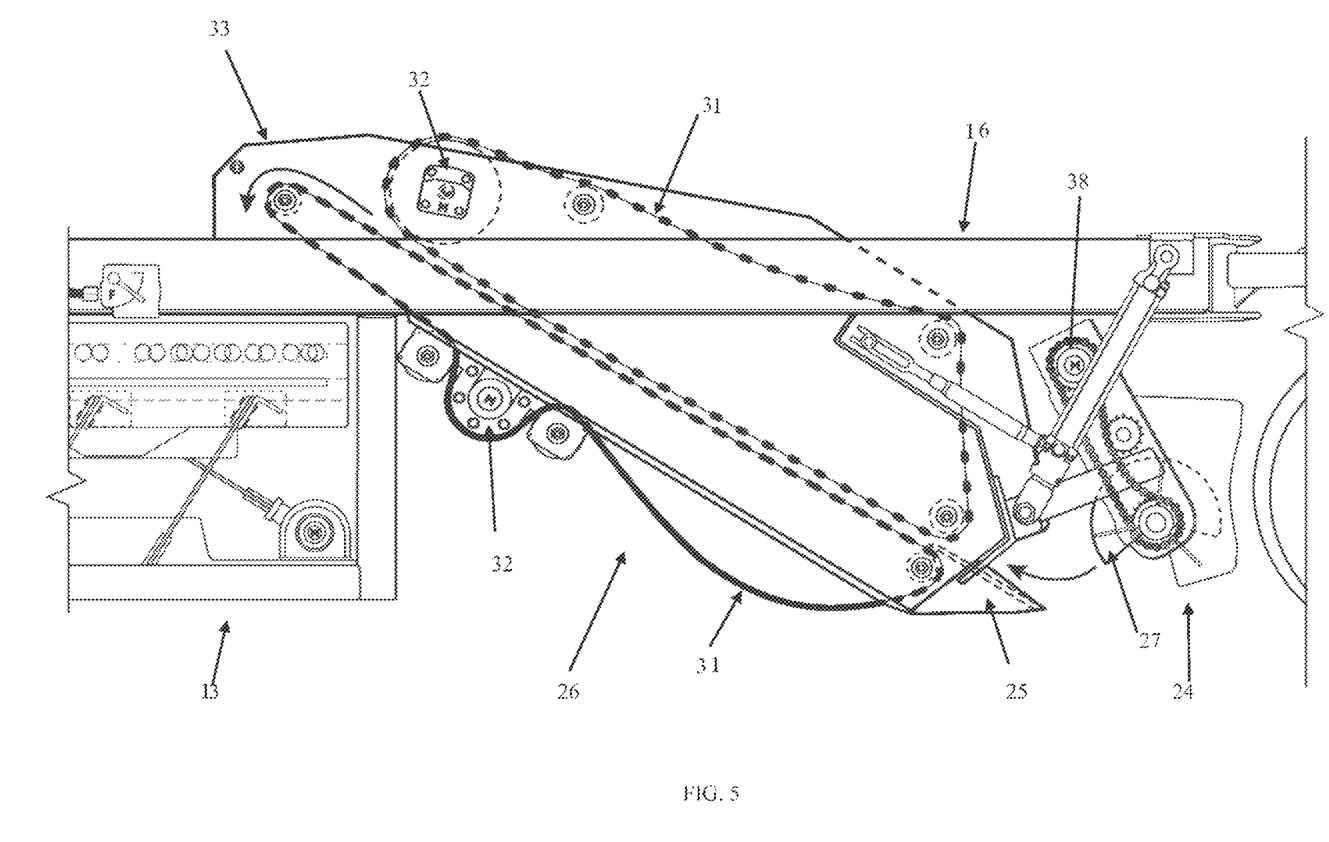
FIG. 5 is a detailed side view of the collection portion of the shot separation and recovery apparatus as shown in FIG. 1.

The collection assembly 12 of the illustrated embodiment, best shown in FIG. 5, includes a cutter subassembly 24 to disturb the soil before collection, a scoop 25 to collect the soil and spent shot and a conveyor assembly 26 to convey the soil and spent shot collected to the separation assembly 13. As illustrated, the cutter assembly 24 is provided ahead of the scoop 25 with the scoop 25 provided ahead of the conveyor 26.

The cutter assembly 24 includes one or more disks 27 or similar in order to open or dislodge or break up the soil prior to collection. The disks 27 of the illustrated embodiment are powered through rotation by a motor 28 and chain drive. The cutter assembly 24 is provided extending across the width of the machine 10. The cutter assembly 24 is height/depth adjustable such that the depth to which the soil is disrupted or dislodged can be changed. In a preferred embodiment, the working depth of the cutter assembly 24 may be up to 300 mm with an average working depth of approximately 250 mm.

The scoop 25 also extends substantially across the width of the machine 20, located behind the cutter assembly 24. The scoop 24 of the illustrated embodiment has a simple angled forward edge which extends downwardly to a working depth, similar to that of the cutter assembly 24 in order to scoop soil into the collection assembly 12 via the forward movement of the machine. The scoop 25 has a hardened forward edge in order to maximise its working life.

The conveyor assembly 26 may be of any type. Initial separation of the soil and other material from the spent shot may begin with the conveyor assembly 26. In the illustrated embodiment, a pair of spaced apart conveyor belts are provided and each conveyor belt is a mesh conveyor belt with openings in the mesh allowing material to fall through if it is of a small size.

As illustrated in FIG. 5, an upper conveyor assembly 29 and a lower conveyor assembly 30 are provided with the lower conveyor assembly 30 to support material thereon as it is conveyed and the upper conveyor assembly 29 spaced apart by a predetermined distance to assist with initial break up of large clumps of collected soil. Each of the conveyor assemblies includes a continuous loop mesh belt 31 and is driven using a motor 32.

As shown, the conveyor assembly 12 is angled upwardly and rearwardly in order to raise the collected soil above the ground level to provide gravity feed into the separation assembly 13 with the rear upper end 33 of the conveyor assembly 12 provided over a forward end of the separation assembly 13.

The separation assembly 13 may use one or more separation processes, of the same or different type, to achieve separation of the spent shot. In the illustrated form, the separation assembly 13 includes both a vibration separation process and a pneumatic separation process.

Figure 4:
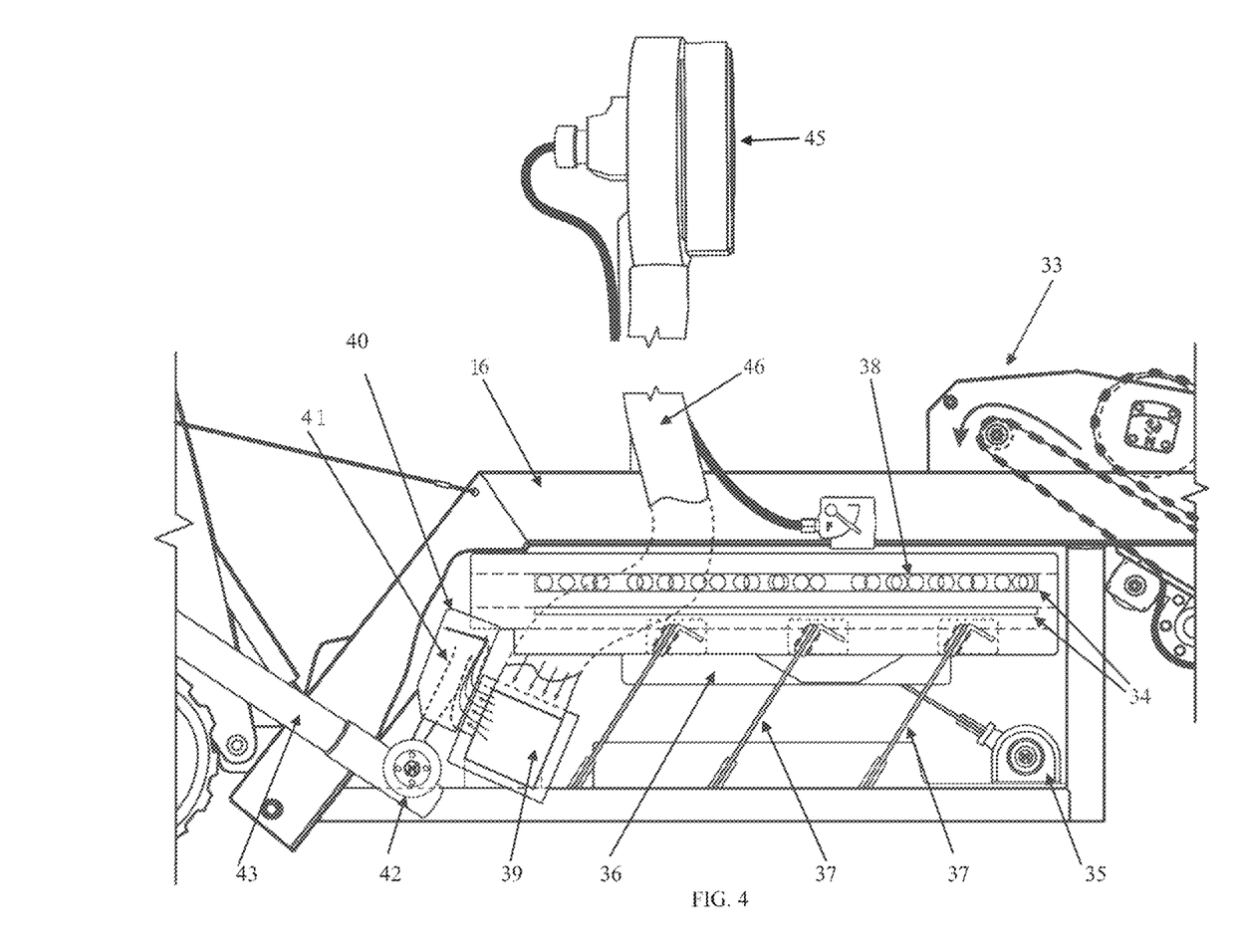
FIG. 4 is a detailed side view of the separation portion of the shot separation and recovery apparatus as shown in FIG. 1.

In particular as illustrated in FIG. 4, a pair of vibration screens 34 are provided parallel to one another. The vibration screens 34 are provided substantially horizontally and spaced apart from one another. Each vibration screen 34 is provided with a different gauge with the upper screen provided with a 3.5 mm gauge and the lower screen provided with a 1.5 mm gauge.

In a preferred embodiment, the vibration will be applied laterally, typically induced by the provision of an eccentric drive 35 with both of the screens 34 mounted relative to a vibration module 36 and the vibration module 36 mounted relative to the integrated unit 15 using arms 37 to allow movement of the vibration module 36 back and forth by the eccentric drive 35.

A number of additional diminution spheres 38 are provided associated with each of the vibration screens 34 (shown on the upper screen in FIG. 4 but removed from the lower screen for clarity) in order to assist with breakup of the material on the screens 34 and/or to prevent clogging of the screens 34. The spheres 38 of the illustrated embodiment are made of a material such as rubber in order to assist with the separation using the vibration screens 34. The spheres 38 will typically be freely movable relative to the screens 34 but are retained relative to a single screen 34, at least loosely. As mentioned above, it is preferred that each screen 34 has a number of spheres 38 provided relative thereto.

The material exceeding from the last screen 34 will exit into the pneumatic separation assembly, into a primary pneumatic separation chamber 39. The pneumatic separation assembly is provided to separate the stones or similar from the spent shot, based on density. Whilst not wishing to be limited by theory, the air will typically carry any stones or similar out of the pneumatic separation assembly but the spent shot, the denser than the stones will typically fall and be retained and collected in the pneumatic separation assembly. Typically, the airspeed and/or pressure will be optimised to allow separation on this basis although the airspeed and/or pressure can typically be adjusted in order to achieve it. After separation, any stones or similar typically returned to the ground surface with the spent shot retained.

In a preferred embodiment, the spent shot will typically fall and be conveyed to a collection vessel 14. One or more screw conveyors 42 can be used in order to convey the spent shot to the collection vessel 14 and typically, the screw conveyor 42 is associated with an elongate conduit 43 in communication with the collection vessel 14, which as mentioned above, is mounted relative to the drive unit 11.

Figure 3:
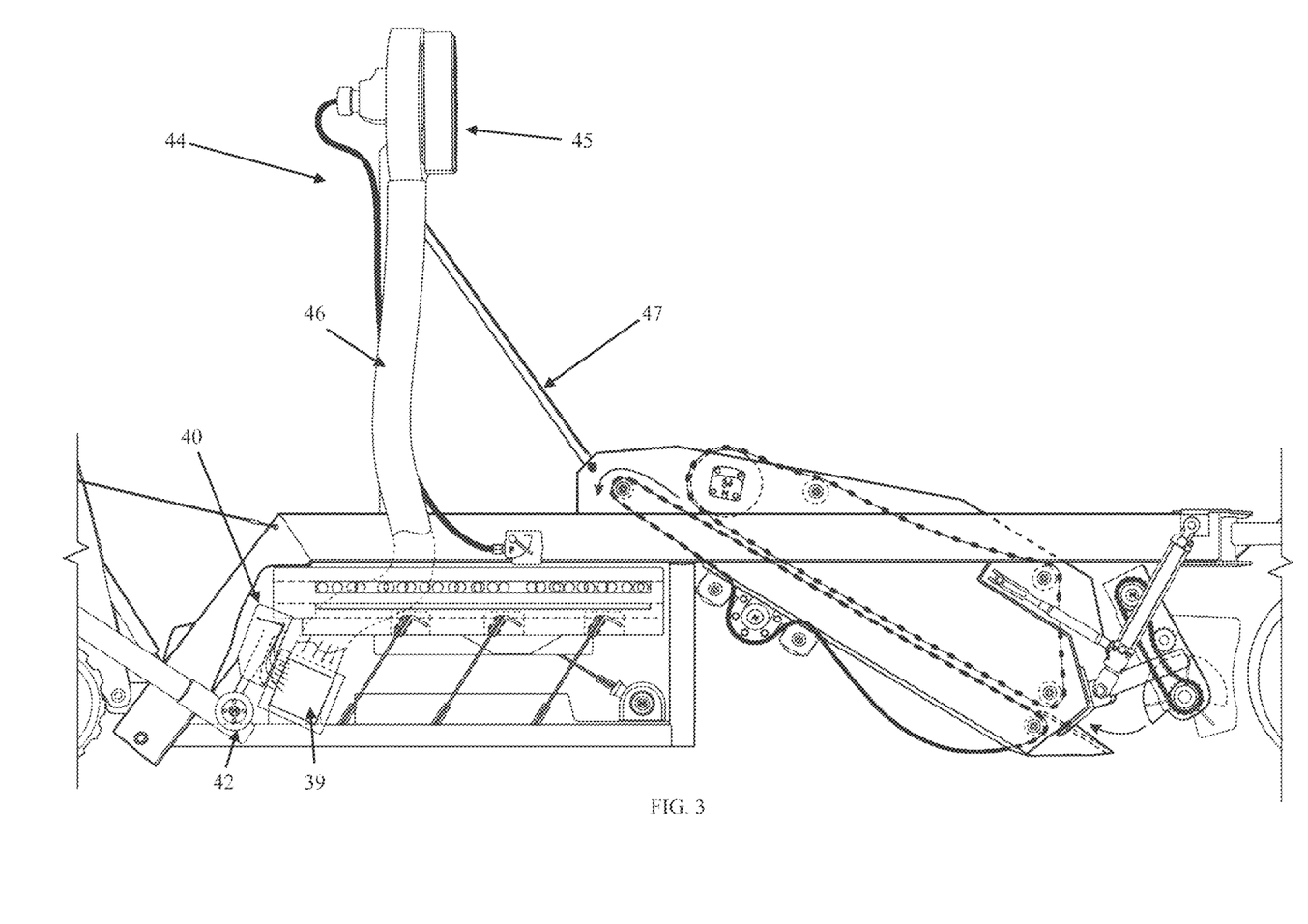
FIG. 3 is a side view of a forward portion of the separation and recovery apparatus as shown in FIG. 1.

The air for the pneumatic separation assembly 13 is obtained from an air cutter assembly 44, best shown in FIG. 3 as an elongate assembly provided substantially vertically above the integrated unit 15 with an air inlet 45 facing forwardly in the direction of travel. The inlet 45 is typically spaced above the integrated unit 15 in order to provide the inlet 45 in an area substantially clear of dust which is formed through use of the machine 10. The air will typically be conveyed downwardly through an elongate conduit 46 directly to the primary pneumatic separation chamber 39. A secondary pneumatic separation chamber 40 is provided in association with the primary pneumatic separation chamber 39 with the secondary pneumatic separation chamber 40 provided with a number of baffles 41 across which the air is blown with the stones and other material conveyed across the top of the baffles 41 but the spent shot, being denser, falling between the baffles 41 into a lower part of the secondary pneumatic separation chamber 40 associated with the screw conveyor 42.

As shown, the air cutter assembly 44 is braced 47 in the vertical orientation and may be foldable or collapsible in order for transport.

As mentioned above, both the separation assembly 13 and the collection assembly 12 are typically provided as an integrated unit 15 with the integrated unit 15 including a support frame 16 with the forward end supported by the wheels 23 and the rear end supported by the drive unit 11 with the separation assembly 13 and the collection assembly 12 mounted relative to the frame 16.

In the illustrated embodiment, the entire integrated unit 16 is covered with dust shields or shroud 48 similar to that discussed above in relation to the drive unit 11 in order to substantially contain any dust which is formed. Again, it is preferred that the dust shields or shrouds 48 are flexible and extend substantially down to ground level as well as across the top of the integrated unit. A water-based dust suppression perimeter is typically defined as discussed above.

Figure 2:
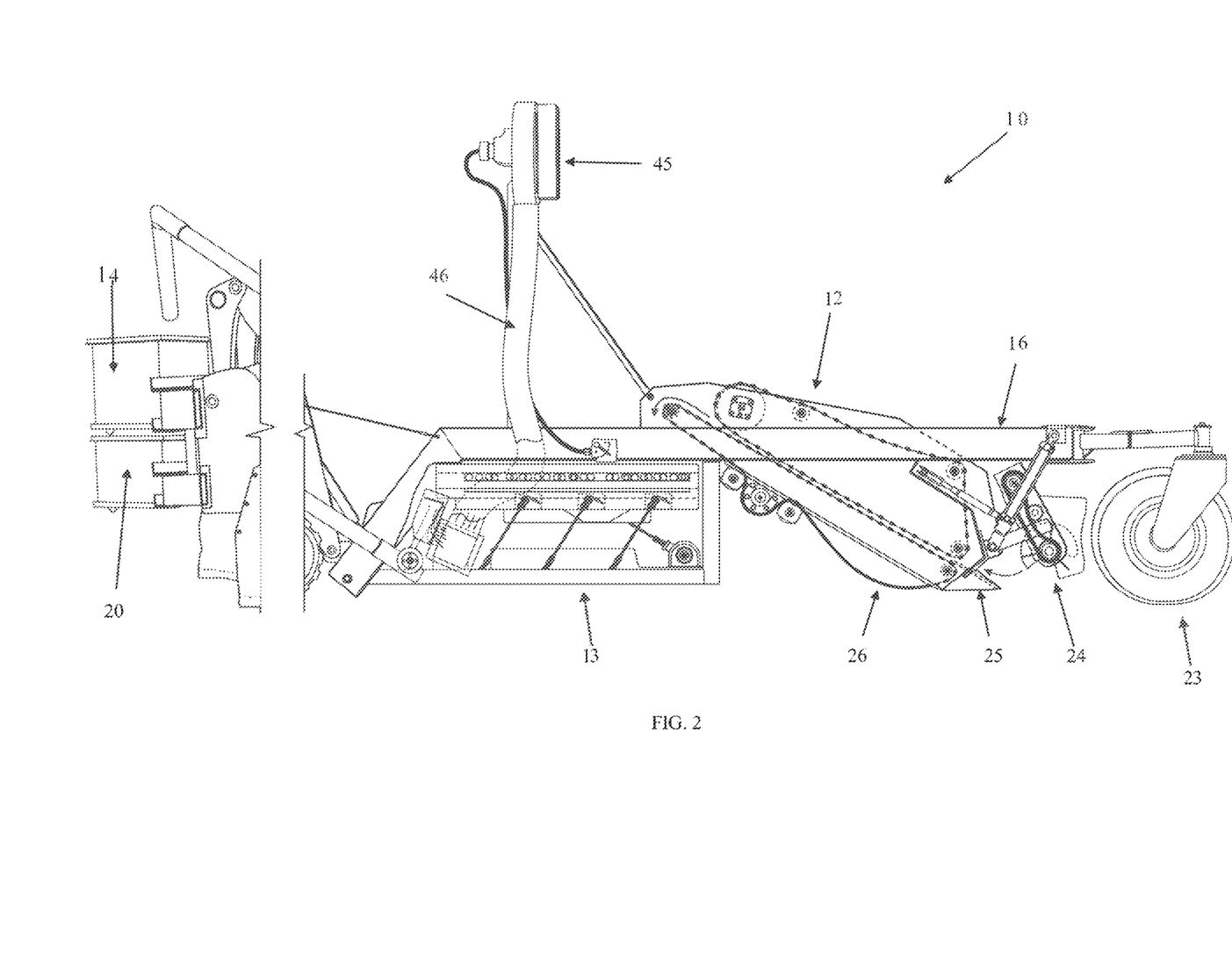
FIG. 2 is a side view of a shot separation and recovery apparatus as shown in FIG. 1 with the drive portion removed.
Figure 8:
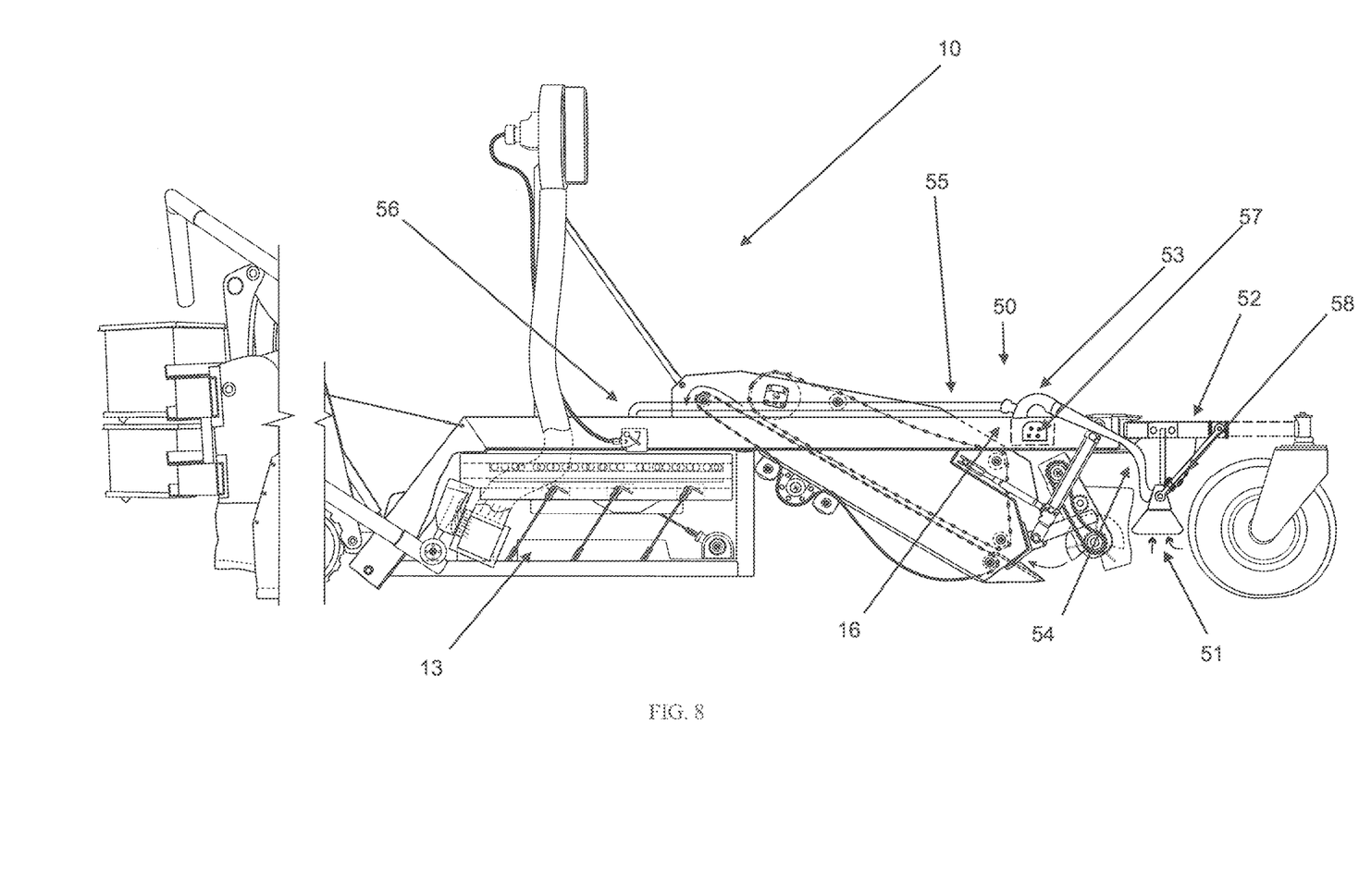
FIG. 8 illustrates a side view of a separation and recovery apparatus according to an alternative embodiment of the invention.

FIG. 8 illustrates a side view of a separation and recovery apparatus 10 according to an alternative embodiment of the invention. The apparatus 10 is similar to that shown in FIG. 2, although the separation and recovery apparatus 10 of FIG. 8 includes a suction assembly 50.

The suction assembly 50 includes a suction head 51 that depends downwardly from the support frame 16 of the apparatus 10 towards the ground surface. In the embodiment of the invention shown in FIG. 8, the suction head 51 is associated with an extension portion 52 of the support frame 16 that is retrofitted to an existing machine.

Loose material on the ground surface is sucked into the suction head 51 via a suction force generated by pump 53. The pump 53 is powered by hydraulic motor 57.

Material entering the suction head 51 passes through hose 54 under the suction force of the pump 53 and is then blown by the pump 53 through hose 55. The material then exits the hose 55 through outlet 56 into separation assembly 13.

The position of the suction heads 51 relative to the ground surface is configured to be adjusted by hydraulic ram 58. The hydraulic ram 58 can be actuated to move the suction head 51 closer to, or further away from, the ground surface depending on the amount of material desired to be collected by the suction assembly 50.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A mobile machine for separation and recovery of spent shot, the machine including a drive unit to provide self-propelled mobility to the machine, a charged soil collection assembly mounted relative to the drive unit to collect soil charged with spent shot, and at least one separation assembly to separate spent shot from other collected material, the spent shot conveyed to a collection vessel for disposal;
   wherein the at least one separation assembly includes at least one vibration separation process and at least one pneumatic separation process, the at least one vibration separation process includes vibratory screening using one or more vibrating screens, and one or more spheres are retained relative to, and are freely movable relative to, the one or more vibratory screens, the one or more spheres being configured to assist with the break up of material on the screens and/or to prevent clogging of the screens.

2. A mobile machine according to claim 1 wherein a control cabin is provided on or relative to the drive unit.

3. A mobile machine according to claim 1 wherein the charged soil collection assembly and the at least one separation assembly are provided as an integrated unit mounted relative to, or relative to, a forward side of the drive unit.

4. A mobile machine according to claim 3 wherein the drive unit is provided with one or more forward lifting assemblies configured to lift a rear portion or end of the integrated unit.

5. A mobile machine according to claim 3 wherein a forward end of the integrated unit is provided with one or more support assemblies, the support assemblies being adjustable up-and-down to change the height of the integrated unit and/or the separation of the integrated unit relative to a ground surface.

6. A mobile machine according to claim 1 wherein the charged soil collection assembly comprises a cutter subassembly, a scoop and a conveyor assembly to convey the soil charged with spent shot to the separation assembly.

7. A mobile machine according to claim 6 wherein the cutter subassembly includes one or more disks configured to open, dislodge or break up the soil prior to collection.

8. A mobile machine according to claim 6 wherein the cutter subassembly extends across the width of the machine.

9. A mobile machine according to claim 6 wherein a pair of conveyor assemblies are provided, the pair of conveyor assemblies comprising a lower conveyor assembly configured to support material thereon as it is conveyed and an upper conveyor assembly spaced apart from the lower conveyor assembly by a predetermined distance, the upper conveyor assembly being configured to assist with initial break up of large clumps of the soil charged with spent shot and/or to hold the material on the lower conveyor assembly.

10. A mobile machine for separation and recovery of spent shot, the machine including a drive unit to provide self-propelled mobility to the machine, a charged soil collection assembly mounted relative to the drive unit to collect soil charged with spent shot, and at least one separation assembly to separate spent shot from other collected material, the spent shot conveyed to a collection vessel for disposal;
wherein the at least one separation assembly includes at least one vibration separation process and at least one pneumatic separation process, and the pneumatic separation process separates the spent shot from the other collected material on the basis of density.

11. A mobile machine according to claim 1 wherein the spent shot is conveyed to the collection vessel by one or more screw conveyors.

12. A mobile machine according to claim 1 wherein the charged soil collection assembly, the at least one separation assembly and the collection vessel are mounted to or relative to the drive unit in order to form a self-contained machine.

13. A mobile machine according to claim 1 wherein the machine includes a dust suppression system.

14. A mobile machine according to claim 13 wherein the dust suppression system includes one or more water spray assemblies.

15. A mobile machine according to claim 1 wherein the machine is provided with one or more dust shields or shrouds.

16. A mobile machine according to claim 1 wherein the drive unit is provided with one or more tracks.

17. A mobile machine according to claim 1 wherein the other collected material is returned to the ground following separation.

18. A mobile machine according to claim 1 wherein the machine is configured to provide a single pass collection, separation and recovery of the spent shot.

19. A mobile machine for separation and recovery of spent shot, the machine including a drive unit to provide self-propelled mobility to the machine, a charged soil collection assembly mounted relative to the drive unit to collect soil charged with spent shot, and at least one separation assembly to separate spent shot from other collected material, the spent shot conveyed to a collection vessel for disposal;
wherein the machine is provided with a suction assembly configured to exert a suction force on the soil to collect soil therein.

20. A mobile machine according to claim 19 wherein the suction assembly comprises one or more suction heads.

21. A mobile machine according to claim 20 wherein the one or more suction heads extend across the width of the machine.

22. A mobile machine according to claim 10 wherein material exceeding from the at least one vibration separation process exits into the pneumatic separation process.

23. A mobile machine according to claim 10 wherein the spent shot is separated from the other collected material in the pneumatic separation process by adjusting airspeed and/or pressure in a primary pneumatic separation chamber.

24. A mobile machine according to claim 10 wherein air for the pneumatic separation process is obtained from an air cutter assembly.

* * * * *